United States Patent [19]

Dehne

[11] 4,408,540
[45] Oct. 11, 1983

[54] METHOD AND CONVEYOR SYSTEM FOR PROCESSING ARTICLES THROUGH SUCCESSIVE OPERATIONS

[75] Inventor: Clarence A. Dehne, Farmington Hills, Mich.

[73] Assignee: Jervis B. Webb Company, Farmington Hills, Mich.

[21] Appl. No.: 263,270

[22] Filed: May 13, 1981

[51] Int. Cl.³ .............................................. B61B 10/00
[52] U.S. Cl. .................................. 104/172 B; 104/250
[58] Field of Search ........... 104/172 B, 172 R, 172 C, 104/172 BT, 178, 249, 250, 172 S, 91

[56] References Cited

U.S. PATENT DOCUMENTS

| | | | |
|---|---|---|---|
| 2,317,675 | 0/1943 | De Burgh | 104/172 B |
| 3,195,473 | 0/1965 | Dehne | 104/91 |
| 3,229,645 | 0/1966 | Dehne | 104/172 B |
| 3,291,070 | 12/1966 | Bradt et al. | 104/178 |
| 3,434,431 | 0/1969 | Dehne | 104/172 S |
| 3,503,337 | 5/1970 | Haase | 104/172 S |
| 3,518,946 | 7/1970 | Kavieff | 104/172 B |
| 3,672,306 | 0/1972 | Dehne | 104/89 |

FOREIGN PATENT DOCUMENTS 55-40145 3/1980 Japan ................. 104/172 B
2093420 9/1982 United Kingdom ............ 104/172 B

*Primary Examiner*—Robert B. Reeves
*Assistant Examiner*—Richard Mathieu
*Attorney, Agent, or Firm*—Joseph W. Farley

[57] ABSTRACT

A method of processing articles through successive operations requiring access to their top and sides comprises placing each article on a platform of a conveyor carrier, supporting the carrier on a carrier track positioned below the platform, and propelling the carrier through the processing operations by providing the carrier with a driving dog which is engageable by a pusher member of a driven endless chain located below the carrier, and which is disengageable from the pusher for the stopping and accumulation of carriers, as desired. Engagement between supporting wheels and guide rollers of carrier trolleys and the carrier track maintains the platform in proper position. Each carrier includes a driving trolley connected to at least one load carrying trolley by a tow bar located above the carrier track. The driving trolley is provided with a one-piece driving member having a holdback dog and a driving dog which includes a forwardly projecting cam formed with an abutment notch. A stop plate is engageable by the cam and notch to disengage the driving dog from a pusher and stop the carrier.

7 Claims, 10 Drawing Figures

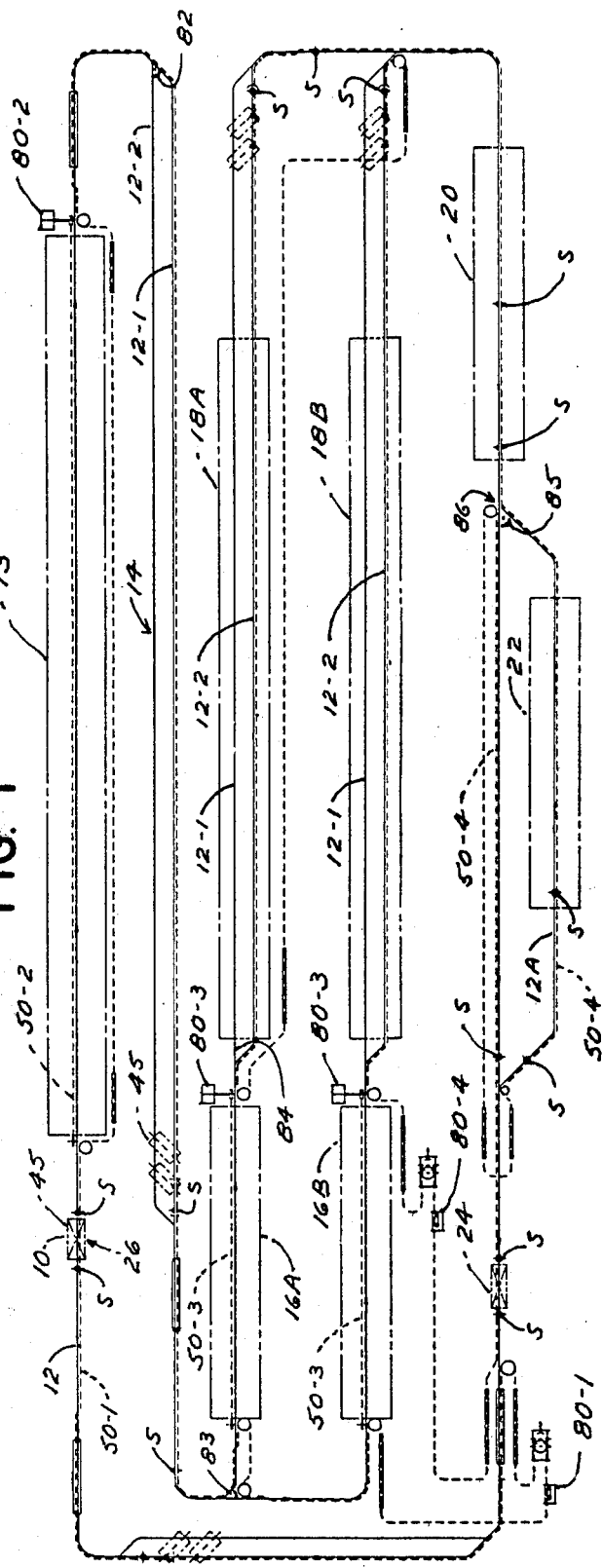

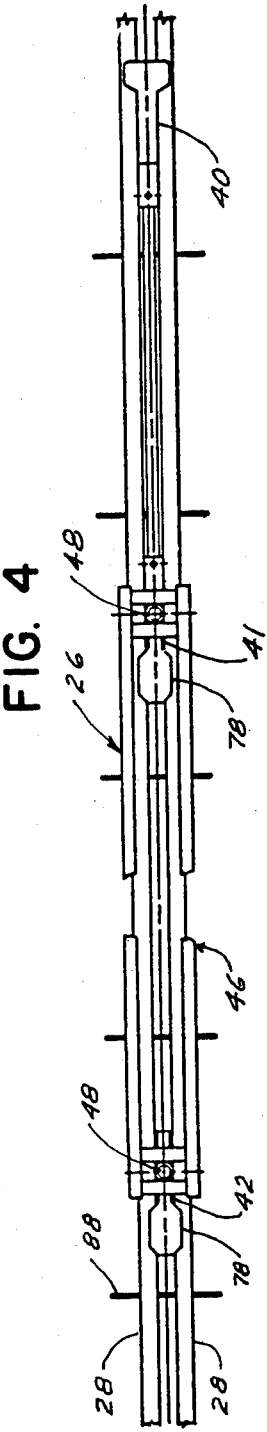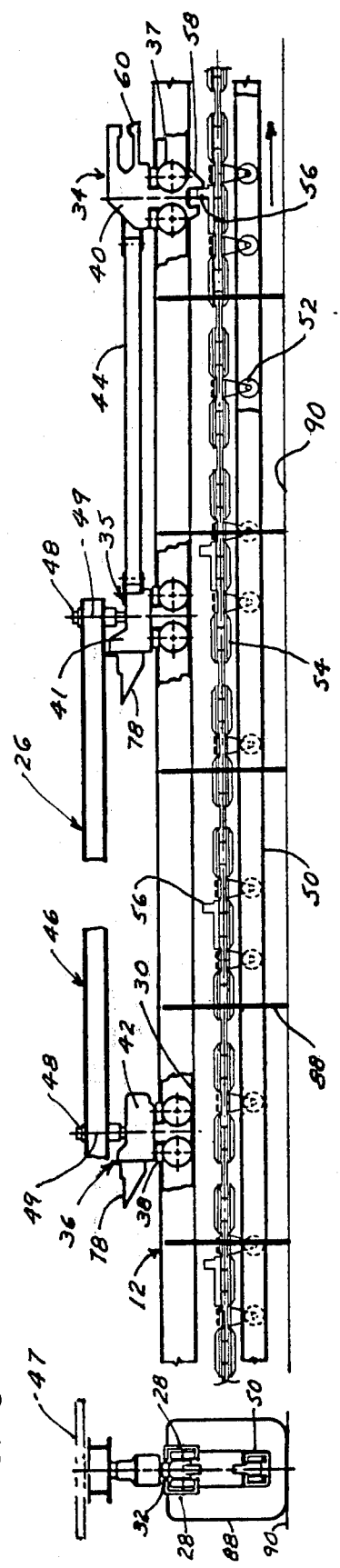

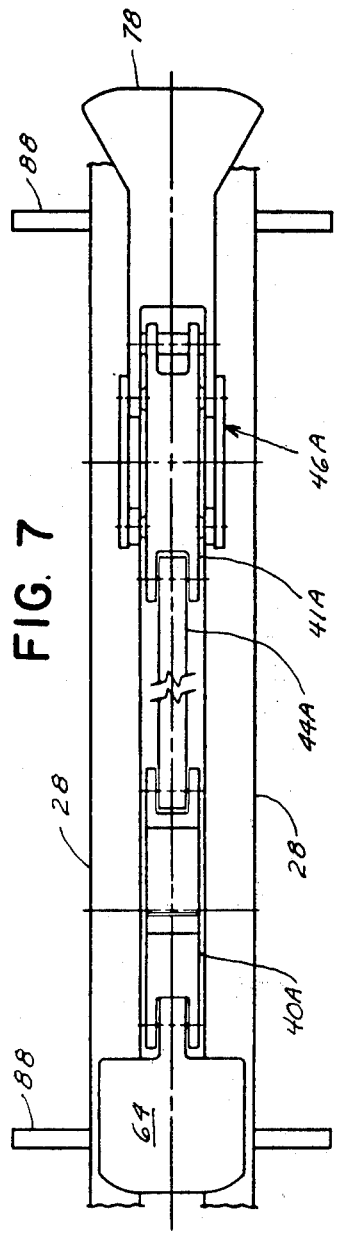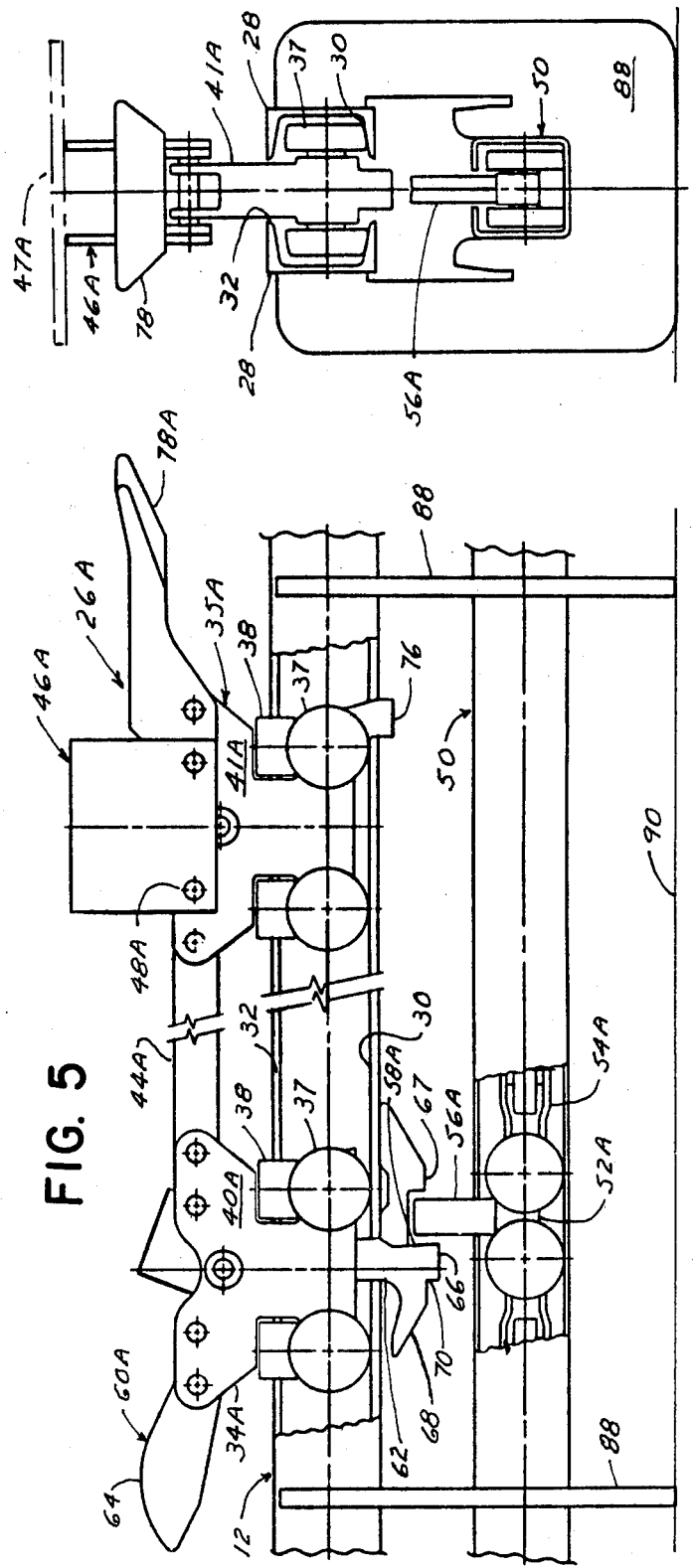

METHOD AND CONVEYOR SYSTEM FOR PROCESSING ARTICLES THROUGH SUCCESSIVE OPERATIONS

This invention relates to improvements in a method for facilitating the processing of articles through successive operations which require substantially unrestricted access to the top and sides of each article for their most efficient performance, and also relates to improvements in a system for conveying articles through such operations.

One example of the successive operations whose performance can be enhanced by the use of the method and the conveyor system of the invention are those involved in the process of applying an exterior finish to articles on a production basis; i.e. such successive operations as preparation, paint, dry, inspect, and repair (as required). The invention enables these operations to be performed with unrestricted access to the top and sides of each article, with no requirement for the handling of articles at any intermediate stage in the processing, and with the selective capabilities of stopping, accumulating, diverting, changing the spacing between articles, and varying the rate of article movement as may be desired for the optimum performance of the complete process.

The method of the invention involves a new use of an overhead power and free conveyor with certain modifications and improvements which are incorporated in the conveyor system of the invention and which enable such a conveyor to be constructed and operated in an inverted manner. Certain operational, structural and economic advantages result from the invention, as will be discussed herein.

Conventional systems for processing articles through successive operations which require substantially unrestricted access to the top and sides of the articles have utilized article carriers either in the form of pallets supported by roller conveyors, as exemplified by U.S. Pat. No. 2,317,675, or in the form of wheeled trucks supported by tracks, as shown by U.S. Pat. No. 3,518,946. Such systems require extensive structure for supporting the article carriers and have inherent limitations on the extent to which movement of the article carries can be controlled. These disadvantages have led to the use for such processing systems of overhead power and free conveyors which offer improved control over carrier movement, but require suspended article carriers which restrict access to the top and sides of the articles being processed, and also require protection of the articles from dirt of the overhead conveyor.

The processing method and system of the present invention provides the advantages of the pallet or truck system and the advantages of the overhead power and free system, with none of the disadvantages of either and at a cost less than either, at least where the weight of the articles being processed requires more than very light-duty supporting structure.

To facilitate the processing of articles through successive operation stations by providing substantially unrestricted access to the top and sides of the articles and by also providing the selective capabilities of stopping, accumulating, diverting, respacing articles, and varying the rate of article movement as desired, the method of the present invention comprises:

(a) providing a carrier track extending from a loading station through the processing stations and returning to the loading station, with the carrier track including a pair of lower, parallel horizontal supporting surfaces and a pair of upper, parallel vertical guide surfaces;

(b) mounting article carriers on the carrier track with each carrier consisting of a driving trolley and at least one load carrying trolley each having body portions projecting above the carrier track, and interconnecting said projecting body portions of the driving and one load carrying trolleys by a tow bar;

(c) supporting the articles from below by structure attached to the body portion of the load carrying trolley above the carrier track and maintained in article supporting position by engagement between the load carrying trolley and the supporting and guide surfaces of the carrier track;

(d) providing a power track positioned below and in vertical alignment with the carrier track;

(e) mounting on the power track a driven endless chain equipped with pusher members projecting toward the carrier track; and (f) providing the driving trolley with a vertically movable driving dog connected to a forwardly projecting operating lever and biasing the driving dog by its weight to a lower driving position in which it is releasably engageable by one of the pusher members.

The foregoing method may also be practiced by employing article carriers each consisting of first and second load carrying trolleys, and by connecting these first and second load carrying trolleys above the carrier track by the article supporting structure. When such article carriers are employed, the orientation of the articles can be changed by providing along a portion of the carrier track first and second parallel carrier tracks spaced apart transversely a distance less than the longitudinal spacing between the first and second load carrying trolleys, and by causing the first and second load carrying trolleys of each article carrier to respectively travel on the first and second parallel carrier tracks. Article carriers can be compactly accumulated on these parallel carrier tracks by providing the first load carrying trolley of each article carrier with an actuator engageable by the operating lever on the driving trolley of a following carrier for releasing the driving dog of that carrier from engagement with the pusher members.

A system of the invention for conveying articles through successive processing operations which require substantially unrestricted access to the sides and top of the articles comprises:

(a) a carrier track that includes a pair of lower, parallel, horizontal supporting surfaces and a pair of upper, parallel, vertical guide surfaces;

(b) a plurality of article carriers each having a leading driving trolley and at least a first load carrying trolley trailing the driving trolley, each of the trolleys having wheels engaging the supporting surfaces of the carrier track, rollers engageable with the guide surfaces of the carrier track, and a body portion extending above the carrier track;

(c) a tow bar located above the carrier track and connecting the body portion of the driving trolley to the body portion of the first load carrying trolley;

(d) article carrying means forming a platform-type of article supporting structure located above the carrier track and above the tow bar, connecting means attaching the article supporting structure to the body portion of the load carrying trolley, the carrier track and the load carrying trolley maintaining the article supporting structure in a substantially horizontal, article carrying position; and (e) a power track mounted below the carrier track in vertically aligned relation therewith, driving means including power trolleys mounted on the power track, a driven chain connected to the power trolleys and pusher means projecting upwardly toward the carrier track for engagement with driving dog means depending from the driving trolleys;

(f) the driving dog means comprising for each driving trolley a driving dog member mounted on the body portion of the driving trolley for vertical movement between a lower driving position and an upper non-driving position, a lever pivotally secured to the body portion of the driving trolley, said lever having one arm connected to the driving dog member, and an operating arm projecting from the driving trolley above the carrier track and in the direction of forward movement said driving dog member being biased to the lower driving position by its weight and the weight of said one arm of the lever.

Preferably, the driving dog member is formed with integral driving dog and holdback dog portions; preferably also, the driving dog portion includes an integral cam which projects forwardly, is upwardly inclined, and has an abutment surface engageable by a stop plate for arresting forward movement of the driving trolley with the driving dog member in its upper, non-driving position.

Other features and advantages of the invention will appear from the description to follow of the embodiments disclosed in the accompanying drawings, in which:

FIG. 1 is a schematic plan view of a representative processing system illustrating the method and apparatus of the present invention;

FIG. 2 is a side elevation showing an article carrier and a portion of the system of FIG. 1 as indicated by the arrows 2—2 thereon;

FIG. 3 is a transverse elevation of the structure shown in FIG. 2;

FIG. 4 is a plan view of the structure shown in FIG. 2;

FIG. 5 is a side elevation showing an alternative form of article carrier and power track of the invention;

FIG. 6 is a transverse elevation of the structure shown in FIG. 5;

FIG. 7 is a plan view of the structure shown in FIG. 5;

Figure 8:
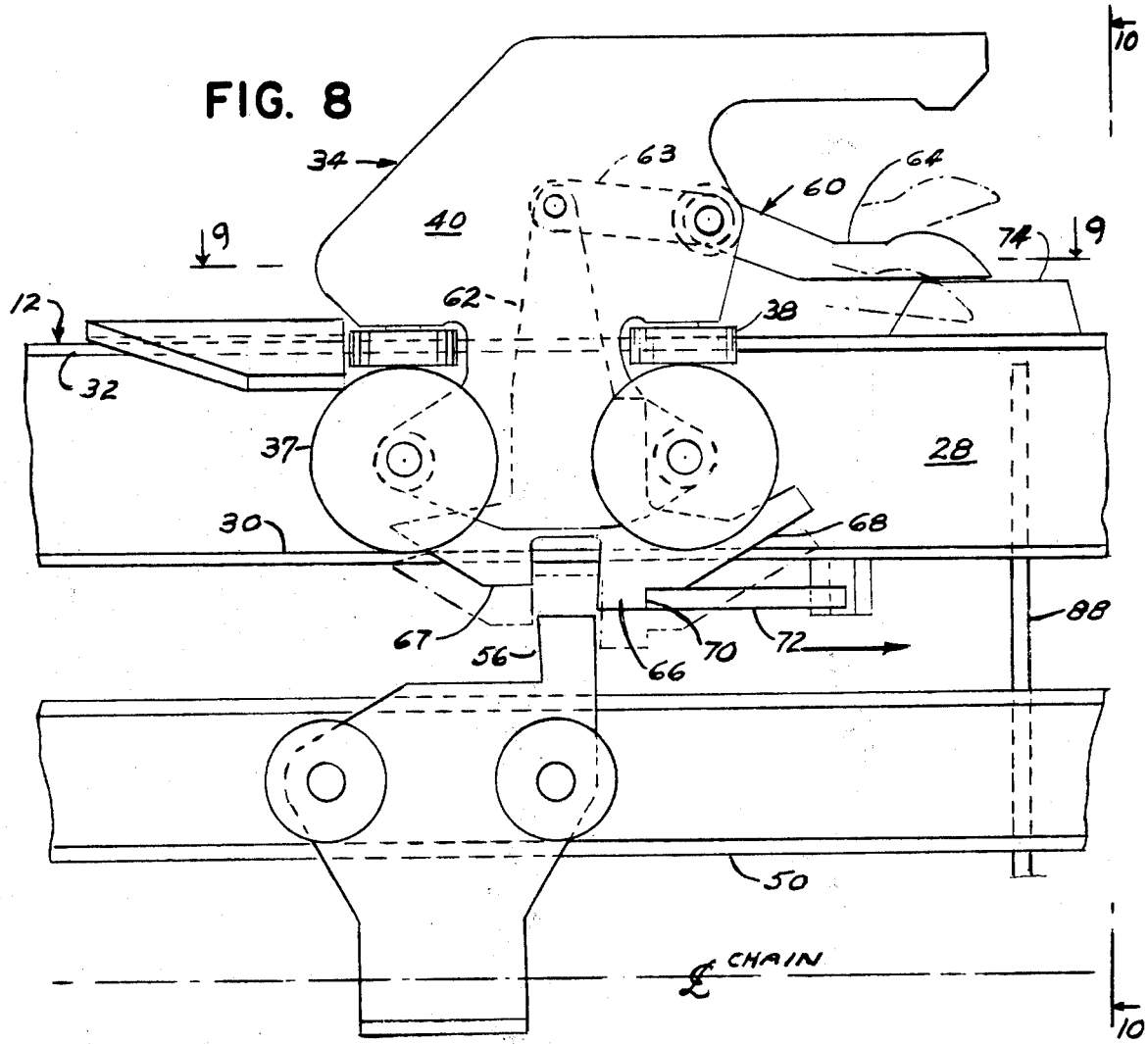
FIG. 8 is an enlarged side elevation showing a driving trolley, of the type used in the article carrier of FIG. 2, engaging a stop plate.

In the processing system of FIG. 1, there is provided a loading station 10 and a carrier track indicated by the solid line 12 extending through successive operation stations 13 (PREPARATION), 14 (ACCUMULATE), 16A and 16B (PAINT), 18A and 18B (DRY), 20 (INSPECT), 22 (REPAIR), 24 (UNLOAD) and returning to the loading station 10. While these operations relate to a system for applying an exterior finish to articles, it should be understood that the invention is not limited to such a system; and that FIG. 1 is not intended to illustrate such a system for processing any particular articles. FIG. 1 is merely intended to illustrate the various features obtainable by the employment of the invention in any article processing system, particularly one where the performance of the operations involved is facilitated by providing substantially unrestricted access to the top and sides of the articles and the selective capabilities of stopping, accumulating, diverting, respacing articles, and varying the rate of article movement.

The system of FIG. 1, as shown, is adapted to use article carriers 26 of the type shown in FIGS. 2-4; but, as will be explained, this system could readily be modifed to use the alternative type of article carrier 26A shown in FIGS. 5-7.

As best shown in FIGS. 3 and 6, the carrier track 12 is formed by a pair of channel section track members 28 and includes a pair of lower, parallel, horizontal supporting surfaces 30 and a pair of upper, parallel, vertical guide surfaces 32.

The article carriers 26 or 26A are mounted on the carrier track 12. Each article carrier 26 consists of a leading driving trolley 34 and first and second load carrying trolleys 35 and 36 trailing the driving trolley. Each of the trolleys 34-36 have wheels 37 engaging the lower supporting surfaces 30 of the carrier track 12, rollers 38 engageable with the upper guide surfaces 32 of the carrier track, and a body portion 40, 41 and 42, respectively projecting above the carrier track 12. The body portion 40 of the driving trolley 34 and the body portion 41 of the first load carrying trolley 35 are interconnected by a tow bar 44.

Articles 45 (FIG. 1) to be processed are supported from below by article carrying means 46 (which will vary in design according to the physical characteristics of the articles 45 and is therefore not completely shown) for forming a platform-type of article supporting structure 47 located above the carrier track 12 and above the level of the two bar 44. The first and second load carrying trolleys 35 and 36 of each article carrier 26 are connected above the carrier track 12 by the structure of the article carrying means 46 by connecting means 48 which permits relative movement between the article carrying means 46 and each of the load carrying trolleys 35 and 36 on a pivotal axis 49 extending perpendicular to the supporting surfaces 30 of the carrier track 12.

Each article carrier 26A of FIGS. 5-7 is similar, but includes only a leading driving trolley 34A having a body portion 40A and one load carrying trolley 35A having a body portion 41A, the body portions 40A and 41A projecting above the carrier track. Wheels 37 and rollers 38 on each of the trolleys 34A and 35A engage the track supporting and guide surfaces 30 and 32, respectively. A tow bar 44A located above the carrier track 12 connects the projecting body portion 40A of the driving trolley 34A to the projecting body portion 41A of the load carrying trolley 35A. Article carrying means 46A form a platform-type of article supporting structure 47A located above the level of the carrier track 12 and above the level of the tow bar 44A, and connecting means 48A attaches the article carrying means and structure to the body portion 41A of the load carrying trolley 35A.

With each of the article carriers 26 and 26A, the article carrying means and structure as maintained in article supporting position by the engagement between the wheels 37 and rollers 38 of the load carrying trolleys 35 and 36, or trolley 35A, and the supporting and guide surfaces 30 and 32 of the carrier track 12. In other words, the carrier track 12 and the load carrying trolleys, or trolley, form the sole support for the article carrying means 46 or 46A. If precise positioning of an article is required for a particular processing operation, a guide track or tracks, engageable by the article carrying means or structure, may be provided.

A power track 50 indicated by the broken line in FIG. 1 is provided and is normally positioned below and in vertical alignment with the carrier track 12, as shown in FIGS. 3 and 6.

Driving means are mounted on the power track 50 and consist essentially of a driven endless chain equipped with pusher members projecting toward the carrier track. As shown in FIGS. 2 and 5, the driving means preferably includes power trolleys 52 or 52A mounted on the power track 50 and a driven chain 54 or 54A connected to the power trolleys. The pusher members 56 in FIG. 2 are mounted on the chain 54 and are longitudinally spaced, corresponding pusher members 56A in FIG. 5 are mounted on the power trolleys 52A.

As shown in FIGS. 2 and 5 each driving trolley 34 or 34A is provided with a vertically movable driving dog 58 or 58A which is connected to a forwardly projecting operating lever 60 or 60A and is biased by its weight to a lower driving position in which it is releasably engageable by one of the pusher members 56 or 56A. This construction is essentially the same for the driving trolleys 34 and 34A and further details will be given with reference to FIGS. 8-10 which illustrate the driving dog means of the driving trolley 34.

For each driving trolley 34 (and 34A) the driving dog means comprises a driving dog member 62 which is mounted in the trolley body 40 for vertical movement between a lower driving position shown in broken line in FIG. 8 and an upper non-driving position shown in full line. The lever 60, pivotally secured to the body portion 40 of the driving trolley 34, has one arm 63 connected to the driving dog member 62 and an operating arm 64 projecting from the driving trolley above the carrier track 12 and in the direction of forward movement. The weight of the driving dog member 62 and the weight of the one lever arm 63 bias the driving dog member to the lower driving position. This biasing action is increased, and other advantages obtained, by providing the driving dog member 62 with an integrally formed driving dog portion 66 and an integrally formed holdback dog portion 67; and by providing the driving dog portion 66 with a forwardly projecting, upwardly inclined arm 68 having an abutment surface 70 formed thereon.

Figure 9:
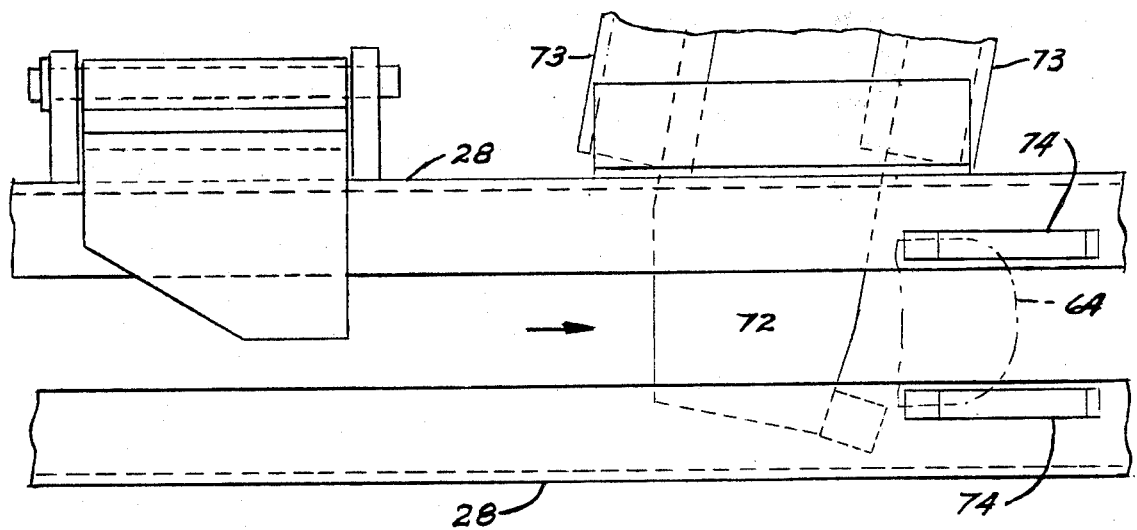
FIG. 9 is a fragmentary plan view, taken as indicated by the line 9—9 of FIG. 8, but not including the driving trolley.
Figure 10:
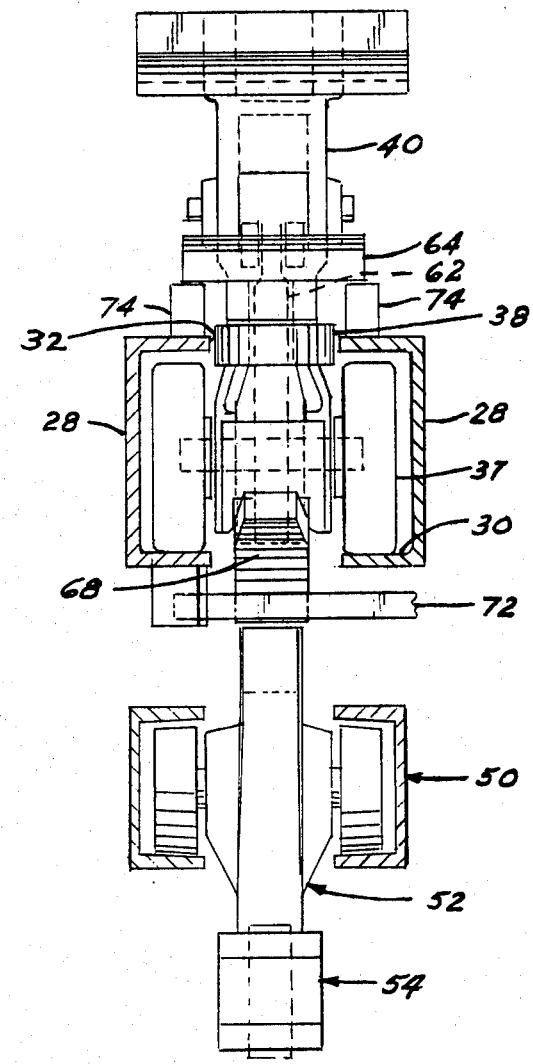
FIG. 10 is a sectional elevation taken as indicated by the line 10—10 of FIG. 8.

A stop plate 72 is mounted below the carrier track 12 and is selectively positionable by an actuating device (not shown) in the path of movement of the driving dog member 62, the stop plate being slidably supported by guideways 73 (FIG. 9). In the position illustrated in FIGS. 8-10, the stop plate 72 is engageable by the cam 68 of a forwardly propelled driving trolley 34, moving the driving dog member 62 to the upper non-driving position, and the stop plate 72 is then engageable by the abutment surface 70 to arrest forward movement of the driving trolley 34 and hold the driving dog portion 66 and the driving dog member 62 in non-driving position.

In order to insure that the upward movement of the driving dog member 62 resulting from the cam 68 engaging the stop plate 72 is not excessive so that the abutment surface 70 would pass over, rather than engage the stop plate, a pair of motion limiting members 74 are mounted on the carrier track and are engageable by the operating arm 64 of the lever 60 should such excessive movement occur. Engagement between the abutment surface 70 and the stop plate 72 is thereby insured. This engagement of the stop plate 72 by the abutment surface 70 is the only engagement that can occur between the stop plate 72 and any part of an article carrier 26 or 26A. Therefore, no damage will result if the stop plate 72 is at any time moved to the position shown in FIGS. 8-10. If the article carrier is equipped with a supplementary push-across dog 76 (FIG. 5) for transfer from one power track to another, that push-across dog is located at a level above the level of the stop plate 72. Reference is made to U.S. Pat. Nos. 3,314,377 and 3,229,645 for disclosures of transfers employing such push-across dogs.

The driving dog member 62 with integral driving dog and holdback dog portions 66 and 67 has the further advantage that when moved to non-driving position as a result of the operating arm 64 of the lever 60 engaging an actuator 78 (FIG. 2) or 78A (FIG. 5) on a load carrying trolley of a preceding article carrier which is stopped, the driving and holdback dog portions 66 and 67 are both moved out of engagement with the pushers 56. Noise and wear during the accumulation of article carriers are reduced in comparison with conventional practice in which the holdback dog of a driving trolley remains engageable by pushers when the driving dog is moved out of engagement thereby. Such conventional practice is further disclosed in U.S. Pat. No. 3,044,416.

Other features and advantages of the invention will be described in connection with the processing of articles in the representative system of FIG. 1 which has a stop plate 72 provided at each of the locations marked S. At the load station 10, an article carrier 26 is stopped while an article 45 is placed on the supporting structure 47; and, when the stop plate is withdrawn, the article carrier is propelled to the preparation station 13 by a pusher 56 of a first chain mounted on a power track 50-1 and driven by a drive unit 80-1; and the article carrier is transferred to a pusher of a second chain 50-2 driven by a drive unit 80-2 at a speed appropriate for the preparation operation.

Following the preparation station, the carrier track 12 is provided with a portion consisting of first and second parallel carrier tracks 12-1 and 12-2 which are spaced apart transversely a distance less than the longitudinal spacing between the first and second load carrying trolleys 35 and 36. Propulsion of the article carrier 26 is transferred back to a pusher of the first chain 50-1 and a switch 82 in the carrier track 12 causes the driving trolley 34 and the first load carrying trolley of the carrier 26 to travel on the first parallel carrier track 12-1 and the second load carrying trolley 36 of the carrier to travel on the second parallel carrier track 12-2. This changes the orientation of the load supporting structure of carriers passing through the accumulation station 14 and enables carries to be accumulated or stored behind the stop S at the downstream end of station 14 with reduced space requirement. The accumulating of carriers in reduced space is carried out by equipping the first load carrying trolley 35 of each carrier 26 with an actuator 58 (FIG. 2) engageable by the operating lever arm 64 on the driving trolley 34 of a following carrier 26.

Carriers 26 are released from the accumulation station 14 as required for painting. This operation is divided into the two paint stations 16A and 16B on the assumption that space and time requirements are thereby better satisfied, and carriers are alternatively fed to the stations 16A and 16B by a switch 83. Carrier propulsion for the painting operation is transferred to a pusher of a third chain mounted on a power track 50-3 and driven by a drive unit 80-3.

From the paint station 16A or 16B, a carrier proceeds to the dry station 18A or 18B, respectively, and each of the dry stations is provided with first and second parallel carrier tracks 12-1 and 12-2 and with an entrance switch 84 for causing the first and second load carrying trolleys 35 and 36 of each carrier 26 respectively to travel on the first and second carrier tracks 12-1 and 12-2, as described above for the accumulation station 14. Carrier propulsion is provided by a fourth chain driven by a drive unit 80-4.

A carrier 26 released from either of the dry stations 18A or 18B is forwarded through the inspection station 20. If any repair work is required on the article supported by the carrier, then the carrier is diverted by a switch 85 to a branch carrier track 12A which passes through the repair station 22. The same power track 50-4 may be arranged to propel carriers either along the branch carrier track 12A or along the main carrier track parallel thereto with a carrier transfer from and to pushers of the driven chain on the power track 50-A, as indicated at 86.

Those skilled in the art will appreciate that the features illustrated by the system of FIG. 1 can be arranged and combined as desired to suit the requirements of a particular processing system. The article carrier structure can readily be adapted to fit the physical characteristics of a particular article, as is apparent from the alternative article carriers 26 and 26A illustrated in FIGS. 2-4 and 5-7. These figures also show the minimum structure required for the carrier track 12, the power track 50, and for plates 88 which rigidly and compactly support these tracks on a base 90 such as a floor. The vertical compactness of this track support and of the article carriers 26 or 26A enables optimum working levels for operations on the exposed top and sides of articles to be readily attained throughout a system.

What is claimed is:

1. Apparatus for conveying articles through successive processing operations requiring access to the sides and top of the articles comprising:
    a carrier track for a plurality of article carriers, said carrier track including a pair of lower, parallel horizontal supporting surfaces and a pair of upper, parallel vertical guide surfaces spaced vertically above said supporting surfaces;
    each carrier having a leading driving trolley and at least a first load carrying trolley trailing in the driving trolley;
    each of said trolley having wheels engaging the supporting surfaces of the carrier track, rollers engageable with the guide surfaces of the carrier track, and a body portion extending between the guide surfaces and above the carrier track;
    a tow bar located above the carrier track and connecting the extending body portion of the driving trolley to the extending body portion of the first load carrying trolley;
    article carrying means for forming a platform-type of article supporting structure located above the carrier track and above the level of the tow bar, and connecting means for attaching the article supporting structure to the body portion of the load carrying trolley, said carrier track and load carrying trolley forming the sole support for the article carrying means; and
    a power track mounted below the carrier track in vertically aligned relation therewith, driving means including power trolleys mounted on the power track and a driven chain connected to the power trolleys, longitudinally spaced pusher means mounted on the driving means and projecting upwardly toward the carrier track for engagement with driving dog means depending from the driving trolleys of the carriers;
    said driving dog means comprising for each driving trolley a driving dog member mounted on the body portion of the driving trolley for vertical movement between a lower driving position and an upper non-driving position, a lever pivotally secured to the body portion of the driving trolley, said lever having one arm connected to the driving dog member, and an operating arm projecting from the driving trolley above the carrier track and in the direction of forward movement, said driving dog member being biased to the lower driving position by its weight and the weight of said one arm of the lever;
    said driving dog member being provided with an integrally formed driving dog and holdback dog extending below the carrier track;
    an upwardly inclined cam formed on said driving dog member forwardly of said driving dog and projecting below the carrier track;
    an abutment surface projecting from said driving dog member rearwardly of said cam and forwardly of said driving dog; and,
    stop plate means mounted below the carrier track for selective positioning in the path of forward movement of said driving dog member, said stop plate means being engageable by said cam for moving said driving dog member to said upper non-driving position, and being engageable by said abutment surface for arresting forward movement of the driving trolley with said driving dog in non-driving position and with said holdback dog in a non-engageable position relative to said stop plate means and to said pusher means.

2. Apparatus according to claim 1 further including means for limiting movement of the driving dog member in response to engagement of said stop plate by said cam.

3. Apparatus according to claim 2 wherein said means for limiting movement of the driving dog member comprises a motion limiting member mounted on the carrier track above the guide surfaces and engageable by said operating arm.

4. Apparatus according to claim 1 wherein each carrier includes a second load carrying trolley trailing the first load carrying trolley and connected to the first load carrying trolley by said article carrying means, said connecting means attaching the article carrying means to each of the first and second load carrying trolleys for relative movement on a pivotal axis extending perpendicular to the supporting surfaces of the carrier track;
    a portion of the carrier track is formed by first and second parallel carrier tracks spaced apart transversely a distance less than the longitudinal spacing between the first and second load carrying trolleys, switch means for diverting the second load carrying trolley to the second carrier track whereby the orientation of the article supporting structure is changed relative to the forward direction of carrier movement, the power track being mounted below said first carrier track along said carrier track portion; and the first load carrying trolley is provided with rearwardly projecting actuating means engageable by the operating arm of a following driving trolley for moving the driving dog member thereof to said upper non-driving position.

5. Apparatus according to claim 4 wherein the second load carrying trolley is provided with rearwardly projecting actuating means engageable by the operating arm of a following driving trolley for moving the driving dog member thereof to said upper non-driving position.

6. A driving trolley for moving an article carrier of a conveying system in a forward direction along a carrier track, said trolley having a body, wheels mounted on the body and adapted to engage the carrier track, and a driving dog carried by the trolley body for movement between driving and non-driving positions in which the driving dog is respectively engageable and not engageable by a pusher of a driven propelling member mounted below the carrier track, said driving dog being movable to non-driving position in response to engagement with a stop plate positionable below the carrier track in the path of forward movement of the driving dog; the improvement wherein:

the trolley body includes an upper portion projecting above the carrier track;

said driving dog and a holdback dog are formed integrally with a driving member having a stem portion movably mounted in the trolley body;

a lever pivotally attached to said upper portion of the trolley body has one arm connected to the stem portion of the driving member and a second operating arm projecting forwardly from said upper portion of the trolley body, said lever and the driving member being movable with the driving dog between said positions and being biased by weight to said driving position;

an upwardly inclined cam formed on the driving member forwardly of the driving dog and projecting below the carrier track is adapted to engage said stop plate and move the driving dog to non-driving position; and an abutment surface on said driving member rearwardly of said cam and forwardly of said driving dog is adapted to engage said stop plate for stopping the driving trolley with the driving dog in non-driving position and with the holdback dog in a non-engageable position relative to the stop plate and to a pusher.

7. A driving trolley according to claim 6 wherein a motion limiting member mounted on the upper portion of the carrier track is engageable by the operating arm of the lever to insure engagement between said abutment surface and said stop plate.

* * * * *

UNITED STATES PATENT AND TRADEMARK OFFICE
CERTIFICATE OF CORRECTION

PATENT NO. : 4,408,540
DATED : October 11, 1983
INVENTOR(S) : CLARENCE A. DEHNE

It is certified that error appears in the above—identified patent and that said Letters Patent is hereby corrected as shown below:

Column 1, line 45, "carries" should read -- carriers --.

Column 7, line 23, "50-A" should read -- 50-1 --.

line 52, delete "in".

Signed and Sealed this

Twenty-seventh Day of December 1983

[SEAL]

Attest:

GERALD J. MOSSINGHOFF

Attesting Officer

Commissioner of Patents and Trademarks